US011996071B2

(12) United States Patent
Rein et al.

(10) Patent No.: US 11,996,071 B2
(45) Date of Patent: May 28, 2024

(54) METHOD AND SYSTEM FOR ENERGY-BASED SONG CONSTRUCTION

(71) Applicant: BELLEVUE INVESTMENTS GMBH & CO. KGAA, Berlin (DE)

(72) Inventors: Dieter Rein, Berlin (DE); Jurgen Jaron, Berlin (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 710 days.

(21) Appl. No.: 17/139,168

(22) Filed: Dec. 31, 2020

(65) Prior Publication Data

US 2021/0125592 A1 Apr. 29, 2021

Related U.S. Application Data

(63) Continuation-in-part of application No. 16/571,395, filed on Sep. 16, 2019.

(60) Provisional application No. 62/731,193, filed on Sep. 14, 2018.

(51) Int. Cl.
*G10H 1/00* (2006.01)
*G10H 1/46* (2006.01)

(52) U.S. Cl.
CPC ............. *G10H 1/0025* (2013.01); *G10H 1/46* (2013.01); *G10H 2210/056* (2013.01); *G10H 2210/105* (2013.01); *G10H 2210/145* (2013.01)

(58) Field of Classification Search
CPC .. G10H 1/0025; G10H 1/46; G10H 2210/056; G10H 2210/105; G10H 2210/145
See application file for complete search history.

(56) References Cited

U.S. PATENT DOCUMENTS

| | | | |
|---|---|---|---|
| 9,286,876 B1* | 3/2016 | Dabby ................. | B42D 15/022 |
| 2012/0312145 A1* | 12/2012 | Kellett ..................... | G10H 1/38 84/613 |
| 2013/0086474 A1* | 4/2013 | Oliver .................. | H03H 7/0115 707/E17.058 |
| 2014/0052282 A1* | 2/2014 | Balassanian ......... | G10H 1/0025 700/94 |
| 2014/0325408 A1* | 10/2014 | Leppanen ............. | G06F 16/686 715/765 |
| 2017/0092248 A1* | 3/2017 | Gozzi .................. | G10H 1/0025 |

* cited by examiner

*Primary Examiner* — Jianchun Qin

(74) *Attorney, Agent, or Firm* — FELLERS, SNIDER, BLANKENSHIP, BAILEY & TIPPENS, P.C.; Terry L. Watt

(57) ABSTRACT

According to an embodiment, there is provided a system and method for automatic AI-based song construction based on ideas of a user. It provides and benefits from a combination of expert knowledge resident in an expert engine which contains rules for a musically correct song generation and machine learning in an AI-based audio loop selection engine for the selection of fitting audio loops from a database of audio loops. Additionally, in some embodiments there is provided a method of energy-based song construction where the tracks of a multi-track work are balanced depending on the desired output volume level of the final project.

15 Claims, 6 Drawing Sheets

METHOD AND SYSTEM FOR ENERGY-BASED SONG CONSTRUCTION

CROSS REFERENCE TO RELATED APPLICATIONS

This application is a continuation-in-part of co-pending U.S. patent application Ser. No. 16/571,395, filed Sep. 16, 2019, and claims the benefit of U.S. Provisional Patent Application Ser. No. 62/731,193 filed on Sep. 14, 2018, and incorporates said applications by reference into this document as if fully set out at this point.

TECHNICAL FIELD

This disclosure relates generally to methods of editing and generating audio content and, in more particular, to methods utilizing a combination of collected and stored expert knowledge and machine learning in an artificial intelligence-based ("AI") selection engine for automatic audio song construction.

BACKGROUND

Creation of a musical work has been a goal and dream of many people for as long as music has been around. However, a lack of knowledge of details regarding the intricacies of musical styles has prevented many from writing or generating music. As such, this endeavor has, for a very long time, been the purview of individuals having the necessary knowledge and education.

With the advent of the personal computer and other computerized devices (e.g., tablet computers) and the widespread adoption of these devices in the home consumer market, software products emerged that allowed a user to create original music without the need-to-know music theory or needing to understand the terminology of music constructs such as measures, bars, harmonies, time signatures, key signatures, etc. These software products feature graphical user interfaces that provide users with a visual approach to song and music content creation that allowed the novice user easy access to the tools useful in music generation and enabled the users to focus on the creative process without being hampered by having to learn the intricacies of music generation.

In addition to increasing the accessibility of music generation, the content that is available and usable in the process of generating music has also been adapted to correspond to the directive of supplying an easy-to-use music generation approach. These sorts of programs typically provide a number of individual sound clips of compatible length, e.g., sound loops or just "loops", which can be selected and inserted into the multiple tracks of an on-screen graphical user interface as part of the process of music creation. With these sorts of software products, the task of music or song generation has come within reach of an expanded audience of users, who happily take advantage of the more simplified approach to music or song generation as compared with note-by-note composition. These software products have evolved over the years, gotten more sophisticated and more specialized and some have even been implemented on mobile devices.

The general approach to music or song generation provided by these software products has remained virtually unchanged, even though the processing power of the computing devices has increased and the types of devices that run this software has expanded on par with the changes in device distribution. That is, the conventional approach to music creation which has remained largely unchanged involves requiring the user to select individual pre-generated audio loops that represent different instruments (e.g., drums, bass, guitar, synthesizer, vocals, etc.), and arrange these loops in digital tracks to generate individual song parts, typically with a length of 4 or 8 measures, the goal being the generation of a full audio clip or song. Using this approach most users are able to generate one or two of these song parts with the help of the graphical user interface of a mobile or desktop-based software product according to their own taste and are therefore potentially able to generate individual verses and maybe the refrain of their own song.

A complete song or a complete musical composition however is normally, for example, at least two minutes long and includes more than only one song part, e.g., up to 16 individual song parts might be used to generate a sonically pleasing composition. To generate so many song parts with the necessary enthusiasm and eye for detail exceeds the patience and endurance of most users and these users often end the creation process in frustration without completing a musical work, obtaining one that is of insufficient length, or obtaining a work that is not musically satisfying. In addition to these problems on the creative and user interface side of the creation process, repeated discontinuation of the creation process of a song or music piece may result in permanent abandonment of the software product itself which is also not desirable either for the user or the provider of the software since completion of the project provides the user with positive feedback in the form of pride in having completed the project which potentially also results in a favorable impression of the software tool used to do that. Additionally, given the prevalence of social media, production of a musically appealing composition can result in approval from a valued online community when the work is posted which, in turn, encourages the undertaking of additional music creation projects.

Thus, what is needed is a system and method that allows a user to complete the song or music generation process and produce a result that is a musically pleasing complete song or music piece. What is also needed is a system and method that provides the user with expert guidance in creating the work, where the guidance is based on collected and evolving expert knowledge and machine learning in a AI-based system for selection and positioning of suitable audio loops consistent with a user's end goal.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for hybrid AI-based song or music piece construction. In one embodiment the algorithm is integrated into a music generation/song construction process and comprises a combination of expert knowledge in an expert engine and the utilization of machine learning processes in an AI-based loop selection and provision engine. The expert engine provides information and support for the user to make sure that the song construction process is musically correct regarding a preferred song structure, wherein the AI engine is directed to suggest and provide proper and fitting audio loops consistent with the user's musical goal.

Discussed herein are four methods of constructing musical work variants based on energy. It should be noted that for better understanding for all four methods the terms channel and tracks have been utilized intermittently representing the same thing—the individual instruments being part of a song part of a musical work. One approach processes a seed musical work part and disables instruments depending on the number of instruments/tracks. In some embodiments a high energy work will result from leaving at least six instruments unmuted, a medium energy work would leave at least four tracks unmuted, and a low energy work would leave at least 2 unmuted and the GAN creates the songs from the generated seed parts.

A second approach processes the instruments using absolute or relative volume changes. However, not every instrument will necessarily be processed. Some tracks might be left at their original volume or, in other cases, their volumes might be adjusted, or they might be muted if it becomes desirable to reduce the number of instruments.

A third approach processes the instruments with relative volume changes. This may or may not include modification of the volume of every instrument individually. Of course, if the volume of the entire work is reduced, that will also reduce the level of each individual track.

A fourth method processes an existing musical work and creates three individual tracks which are then processed. to generate medium and/or low energy version variants. In this embodiment, the user initiates a de-mixing algorithm that analyzes the audio material of the existing musical work and separates it into at least three separate individual instrument tracks. The tracks will be identified as type of instrument, e.g., vocals, drums and other.

There is also provided herein method of music work variant generation comprising the steps of requiring a user to select a high energy seed part; processing said selected high energy seed part; creating medium and low energy seed parts from said processed high energy seed part; and utilizing said created medium and low energy seed parts to generate medium and low energy music work variants, therewith generating music work variants.

In still another variation, a method of song generation is provided that comprises, the steps of: requiring a user to select a music style from among a plurality of music styles; requiring the user to select at least one seed part; requiring the user to choose the creation of at least one of a low energy song, a medium energy song, and a high energy song; using an expert engine to automatically analyze said selected at least one seed part to produce a song skeleton structure based on said selected music style and said at least one selected seed part; using an AI system to select a plurality of audio loops from an audio loop database for insertion into said song skeleton structure, each of said audio loops in said audio loop database having a plurality of performance parameters associated therewith, said AI system selecting said plurality of audio loops for insertion using at least said plurality of performance parameters associated with each audio loop in said database; inserting said selected audio loops into said generated song skeleton structure, thereby generating a music work; using said generated music work to create at least one of a high energy music work, a medium energy music work and a low energy music work; and, performing at least a portion of said low energy music work or said medium energy music work or said high energy music work for the user.

Another preferred arrangement comprises the steps of: requiring a user to select a high energy music work, said music work comprising of a plurality of individual song parts; processing each of said individual song parts for the generation of medium and low energy music work variants, with said individual song parts comprising of a plurality of instrument channels; selecting each instrument channel for each song part of said high energy music work variant; and processing each instrument channel and instrument number for all of said song parts of said high energy music work variant, therewith generating said medium and low energy music work variants.

Still another variation comprises the steps of: selecting an initial high energy music work variant; initiating a de-mixing algorithm on said selected high energy audio material; generating at least three instrument channels from said initiated de-mixing algorithm; and processing the volume of said at least three generated instrument channels, therewith generating low and medium energy music work variants.

There is also provided herein a method of generating a music work comprising the steps of: accessing an instrument hierarchy, said hierarchy containing an ordering of instruments from first to mute to last to mute; accessing a high energy music work, said high energy music work comprising at least 12 tracks, each of said at least 12 tracks being associated with a particular instrument in said instrument energy hierarchy; accessing a volume reduction factor for each of said instruments in said instrument energy hierarchy; receiving from a user a request to create either a medium energy music work or a low energy music work; determining an ordering of said at least 12 tracks based on said instrument energy hierarchy; muting at least said highest energy instrument track; using said volume reduction factor for each instrument to reduce a volume level of that associated track, thereby producing a medium energy music work; and, performing at least a part of said medium energy music work for the user.

In still a further variation a method song generation is provided that comprises the steps of: requiring a user to select a music style from among a plurality of music styles and at least one song part; using an expert engine to automatically analyze said selected at least one song part to produce a song skeleton structure based on said selected music style and said at least one song part; using an AI system to select a plurality of audio loops from an audio loop database for insertion into said song skeleton structure, each of said audio loops in said audio loop database having a plurality of performance parameters associated therewith, said AI system selecting said plurality of audio loops for insertion using at least said plurality of performance parameters associated with each audio loop in said database; inserting said selected audio loops into said generated song skeleton structure, thereby generating a music work; and, performing at least a portion of said music work for the user.

According to another embodiment, there is provided a method of song generation, comprising the steps of: requiring a user to select a music style from among a plurality of music styles and at least one song part; using an expert engine to automatically analyze said selected at least one song part to produce a song skeleton structure based on said selected music style and said at least one song part; using an AI system to select a plurality of audio loops from an audio loop database for insertion into said song skeleton structure, each of said audio loops in said audio loop database having a plurality of performance parameters associated therewith, said AI system selecting said plurality of audio loops for insertion using at least said plurality of performance parameters associated with each audio loop in said database; inserting said selected audio loops into said generated song skeleton structure, thereby generating a high energy music work; and, accessing an instrument hierarchy, said hierarchy containing an ordering of instruments from first to mute to last to mute; accessing said high energy music work, said high energy music work comprising at least 12 tracks, each of said at least 12 tracks being associated with a particular instrument in said instrument hierarchy; accessing a volume reduction factor for each of said instruments in said instrument hierarchy; receiving from a user a request to create a medium energy music work; determining an ordering of said at least 12 tracks based on said instrument hierarchy; muting at least one of said instrument tracks according to said instrument energy hierarchy; using said volume reduction factor for each instrument to reduce a volume level of the associated track, thereby producing a medium energy music work; and performing at least a part of said medium energy music work for the user.

It should be clear that an approach such as this would be a tremendous aid to the user and would additionally provide assistance in the development and the creation of professional music pieces/songs, wherein the formerly tedious and often frustrating process of manually generating song parts and filling these song parts with fitting audio loops is simplified and amplified by expert knowledge and machine learning based information. Therefore, this approach delivers functionality to the user of music creation programs which enables a user to continue and complete the music generation process satisfactory or even automate the music generation process completely. Additionally, due to the fact that the provision and selection of available and potentially usable audio loops is based on machine learning information that is selecting content independent from style-based limitations, the user is potentially provided with options regarding the audio loop selection that he or she might never have imagined, therewith a music piece/song could potentially benefit extraordinarily from such a style limitation breaking suggestion of audio loops.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

Figure 1:
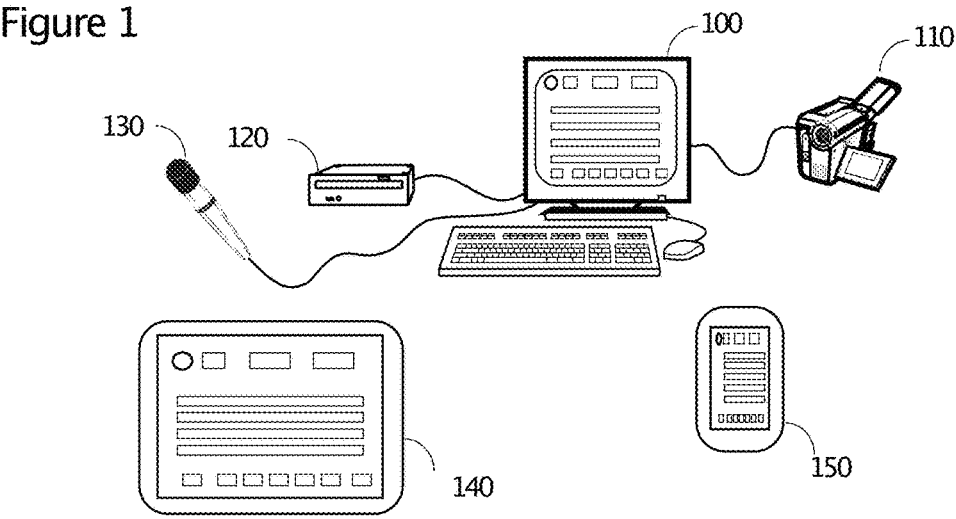
FIG. 1 is an illustration of a working environment of the instant invention according to an embodiment.

While this invention is susceptible of embodiments in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software running on a user's computer 100 or other device with a CPU such as a table computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external camera 110 of some sort be utilized with—and will be preferably be connectible to—the computer so that video and/or graphic information can be transferred to and from the computer (FIG. 1). Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally, a microphone 130 might be utilized so that the user can add voice-over narration to a multimedia work and a CD or DVD burner 120 could be useful for storing in-progress or completed works. Further, it might also be possible and is shown in FIG. 1 that the process of the instant invention might be implemented on portable tablet computer devices 140 or on mobile devices, such as smart phones 150.

Figure 2:
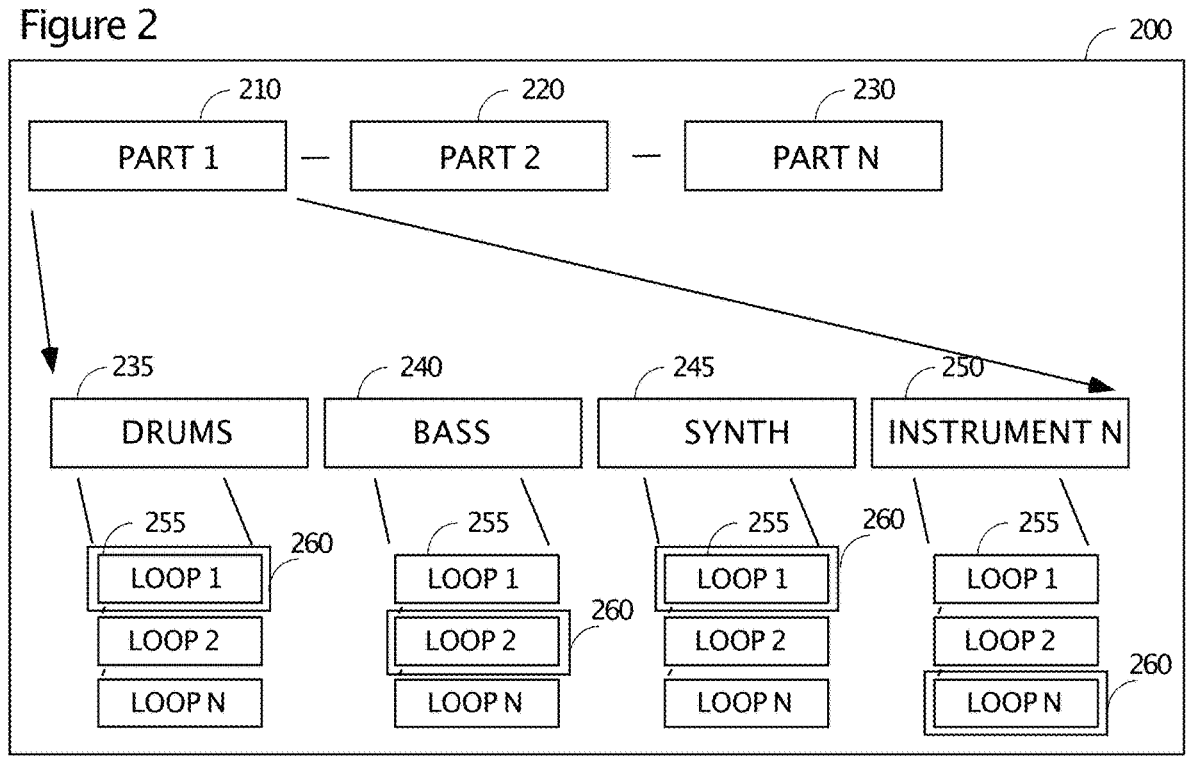
FIG. 2 depicts a general and basic structure of a song or portion of a song according to an embodiment of the instant invention.

Turning next to FIG. 2, this figure illustrates the skeletal structure of a song or a music piece 200 according to an embodiment. This structure functions as the starting point for the functionality of the instant invention. A song or music piece generated by an embodiment of the software product will consist of a plurality of individual song parts which is illustrated by part 1 210 and part 2 220 in FIG. 2, where the denomination of part N 230 is used to show that a potential song or music piece might consist of an arbitrary number of parts. Each part has a specific runtime at a given tempo, which might be selected and defined by the user, alternatively the run time might be strictly defined as being, for example, 4 or 8 measures or multiples thereof. Additionally, these parts might be further specified by, for example, designating them as being an intro or an ending. FIG. 2 also generally indicates that each part of a song or music piece preferably consists of an arbitrary number of instruments, wherein audio loops that sound these instruments are supplied accessible to the user and the AI engine discussed below, an audio loop being a digital section of sound material that usually may be seamlessly repeated, i.e., "looped". Further details with respect to the figure are presented below.

In FIG. 2 the instruments drums 235, bass 240 and synth 245 are depicted, which is not meant to limit the specification of the instant invention to only these instrument variations, on the contrary it should be clear that a plurality of other instrument choices are certainly possible, and the limitation to these three instruments in this figure is only for illustrative purposes. Also instrument N 250 is depicted as being chosen to illustrate this fact, where N stands for an arbitrary number of instruments. For each of the available and potentially selected instruments at least one audio loop 255 at a time is selectable 260 and therewith being replayed during the play time of the particular part. The selection of each audio loop is either carried out by the user manually or automatically by the instant invention.

Figure 3:
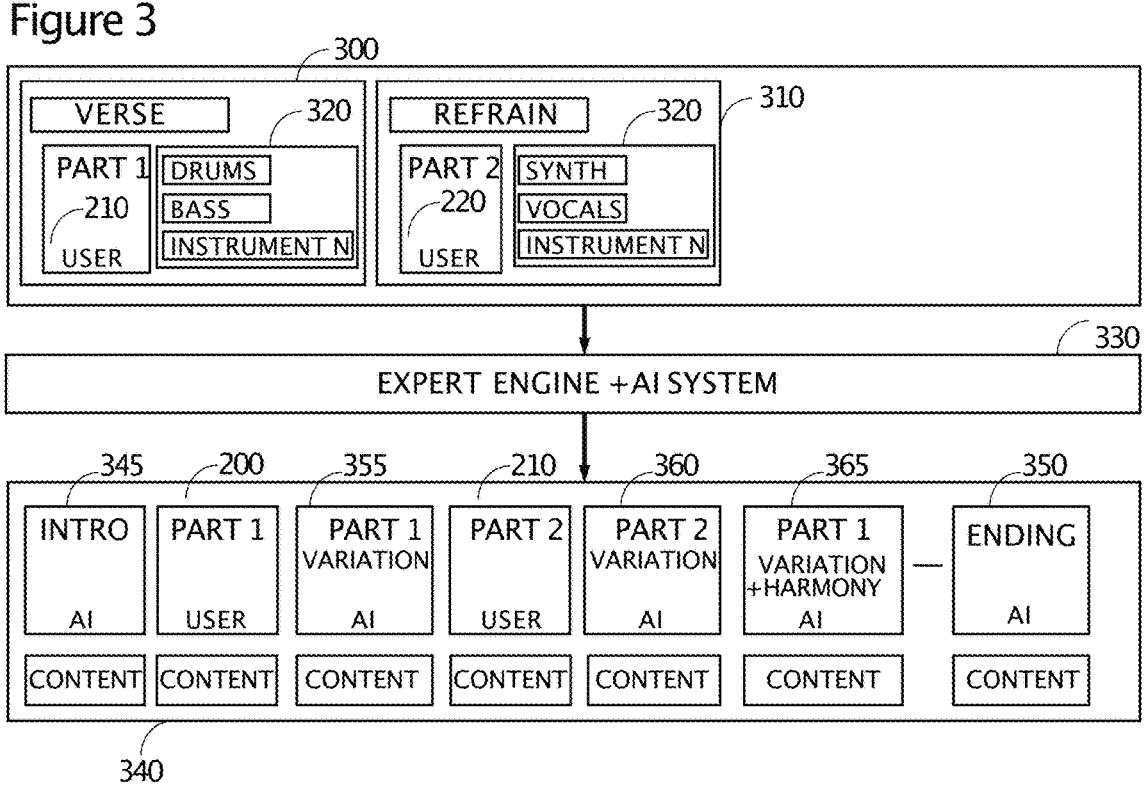
FIG. 3 illustrates a high-level view of the interaction of the parts of an embodiment.

FIG. 3 gives additional details of the process of constructing a skeleton. The structure or skeleton of a song is depicted there. In this example, a song is constructed of 8 individual sections, which might be an intro 345, an ending 350, all of the user supplied sections with their content 200 and 210, and, in this particular example, a mixture of variations of these supplied parts (355, 360 and 365). In addition, parts might be added to the skeleton to lengthen the runtime of the work. So, in this example the skeleton basically includes an intro and an ending and in between the user parts plus variations of these parts and new parts, the variations and new parts preferably being chosen and defined and automatically added by the expert engine. Of course, other song parts might be available including, for example, a song bridge, a song refrain/chorus, pre-chorus, etc.

The AI system uses the skeleton model as a starting point and the skeleton model has the song structure planned, i.e., the parts, style, instruments and so on. To fill in the gaps in the skeleton model the AI system analyzes each empty part and its desired content (as specified by the skeleton) and fills it with loops consistent with the requirements of those parts. The AI system has access to all of the loops and information about all the loops in the loops database and their associated auditory properties. The AI system may or may not select a loop from a style that is normally used to, for example, to generate a blues song if "Blues" is the selected style. But, if the AI system determines that the auditory properties of a different loop in the database are sonically compatible or even better suited then it may select that loop for insertion into the skeleton, independent from the style association of that loop.

In one preferred embodiment the selected audio loop is played during the whole runtime of the part to which its parent instrument belongs, however it is also possible that the user may select and de-select or switch individual audio loops during the runtime of the particular part. The instant invention provides and utilizes an evolving and growing database of audio loops, wherein the audio loops are categorized according to one or more particular styles, for example EDM, 50 s, Drum'n Bass and House. Each individual style features a plurality of different instruments associated with it and each instrument has a specific number of associated audio loops, i.e., audio loops in which the instrument sounds when the loop is played (e.g., recorded). Of course, there might be one or multiple instruments recorded in a loop. Also, in some cases, the loop might not contain traditional audio recordings of an acoustic instrument but might contain computer generated sounds that resemble (or not) traditional instruments. Either way, when it is said that an instrument is recorded in a loop that term should be broadly construed to cover instances where there is a digital audio recording of that instrument as well as cases where the audio material in the loop is computer or otherwise generated. This database will preferably be updated on a regular basis with new styles and the associated instruments and loops being added, existing styles with the associated instruments and loops being updated or deleted, etc. Preferably these updates will be delivered over the Internet for free or in exchange for a particular payment option.

Talking further about FIG. 3, this figure illustrates the interaction of the participating parts of an embodiment of the instant invention in a compressed form. Preferably in most cases, the instant invention will begin with a fragmented song or music piece, comprised of at least one, and preferably two, selected and defined song parts, usually a verse 300 and a chorus or refrain 310 of a music piece. These song parts are generated and provided with audio content 320 by a user, the content preferably being audio loops selected by the user.

This song fragment might be the starting point for the instant invention; alternatively, the starting point might be the selection of a music style, or a seed song from a song library. For each of the different starting points the following steps are the same in this embodiment—the starting data (e.g., loops/variation/style/volume or intensity or dynamic, etc.) is selected by the user and provided to the combination of the expert engine and the AI system 330. This combination will preferably proceed to sequentially process the existing user-defined starting point and as a result provides a complete song 340 for review by the user. Additionally, the user might influence the song creation process by specifying a desired tempo or preferences regarding the dynamic progression of a song (for example—the beginning should be calm—in the middle it is aggressive and at the end energetic).

By way of additional details, in certain embodiments an expert engine will analyze the user defined or selected song parts to identify a preferred style. Based on the style a song length will be chosen by the expert engine that is predominantly associated with that style. That is, the expert engine will contain rules, guidelines, preferences, etc., provided by experts who are familiar with a particular style of musical works, collectively "rules" hereinafter. That being said, it should be understood that these guidelines might (or might not) be strict rules, but instead are more general preferences. The rules that are accessible by the expert engine might include things such as the length of the song, preferential chord change patterns, preferable instruments, preferable tempos, preferable percussion patterns, etc. Thus, the user may, for example, override the suggested song length and choose an alternative length if that is desired. Given the identified or selected style, the following sorts of decisions can be made by the expert engine as part of the music work creation process:

the song skeleton will be generated;
instruments/voices/loops will be selected;
a harmonic progression can be selected;
the dynamics dramaturgy of the musical work can be determined for the musical that is to be created; and
the range of variation that is permitted in the selected loops for that style can be established, e.g., how many loops can be changed and how different from the loops already in use a newly selected loop can be, etc. (i.e., a "variance setting" hereinafter, described in greater detail below below).

To better understand the capabilities of the expert system, it may be useful to understand how an embodiment is constructed. The expert system is a conglomerate of information gathered from music experts who were asked to provide information about how a particular song in a selected style should be built within the confines of a loop-based music generation system. So, the expert system is a curated system that is constantly updated and therefore living i.e., constantly updated system which is incremented by new additions or changes to the contents of the expert system.

With respect to the AI system, this system has access to a loops database, wherein each loop is associated with one or more different compatible music styles or genres (e.g., African, Arabic, Asian, blues, country, electric, folk, hip hop, jazz, Latin, pop, R&B/soul, rock, classical, etc.). The AI is trained with all the loops independent of the style association, meaning that the AI system has access to all the parameters of the loops, their auditory properties (calm/ aggressive, singer, no singer, female singer etc.), their lengths, tempos, dynamics and key and the associated instrument and style.

The AI system uses the skeleton model as a starting point and the skeleton model has the song structure planned, i.e., parts, style, instruments and so on. To fill in the gaps of the skeleton model the AI system analyzes each part and its desired content and fills it, even if the style of the loop is different from the requested style. So, the AI system is not limited to use the designated style in selecting loops—there are no style boundaries with the AI system in terms of loop selection. Even though the skeleton model is requesting specific audio loops of styles, the AI system potentially utilizes other information to select loops that might not be associated with the requested style, it might even be associated with a style that is not musically combined or used with the requested song style. For example, if the requested designated style is "blues" and the AI system identifies a loop from a different style that is compatible and well suited for the requested part of the skeleton model, that loop might still be selected and inserted into the skeleton model.

The loop selection process is based on the auditory properties and requirements and particular characteristics of the song skeleton and the instrument type. So, for example, a loop might be stored in the database with a number of performance-related parameters values such as its length (in beats, measures, run time, etc.), a preferred tempo, its timbre, a measure of its harmonic compatibility (e.g., is it in major or minor key, are there particular styles that it is incompatible with, can it be transposed without loss of quality to the current key, etc.), rhythmic information (e.g., is it syncopated, straight time, —properties of music). These values are stored for each loop in the database and the AI utilizes some or all of these performance parameters when being trained and ultimately when selecting new loops. When an embodiment of the AI system is requested to fill in a song skeleton, it will first look at the user-provided audio loops (provided by the user in the parts, e.g., parts 200 and 210). It will also determine with which instruments each loop is associated, i.e., which instruments each loop expresses. The AI will analyze the performance parameters of the initial existing loops and select loops for insertion for which the values (in view of all performance parameters) are within a defined threshold and belong to a particular instrument. It may be clear now that the type and preferences of the song skeleton does not necessarily control the loop selection process to any great extent. The loop definition and selection process are primarily based on the user-chosen audio loops and their associated data values—meaning, the type of instruments associated with the audio loops and therewith skeleton model also contributes to the loop selection process.

The completed song preferably consists of an intro section 345 and ending section 350, any pre-existing user-generated song parts 210, 220 and a plurality of additional song parts that have been generated according to structural requirements defined by the expert engine and filled with appropriate content provided and proposed by the AI system. So, for example, the AI system may select different audio loops for the vocal instrument selected in original part 2 220 and the expert engine may determine it structurally inconsistent to have different audio loops in the vocals instrument and may delete the vocal instrument completely, thereby generating a variation 360 of original part 2.

Instead of changing or deleting specific audio loops from the different parts and instruments other options are also available for the generation of variations of the selected parts, for example the expert system may change the harmony of the part, the bpm (beats per minute) of the song part, create a harmonic progression for the selected part, change the intensity of effects over the running time of the selected part—all these options resulting in a variation of an original part. The instant invention additionally provides a global setting for the variance whose spectrum might be definable by the user and which ensures that for each iteration of the instant invention different but still fitting audio loops are selected and inserted. With this variance setting the system will preferably be able to generate many different variants of a song or music piece in a very short amount of time, wherein all these variants are based on the initial song ideas from the user. Additionally, to the global setting for the variance it might also be possible that the variance setting might be applied to individual song parts only.

As an example, suppose song No. 1 has part 1 with three instruments and in each instrument one loop, with part 1 having been constructed by the user. The AI system knows the auditory properties of these three loops and if the variance level is low the AI system in its selection of new loops for part 2 in the skeleton model only selects audio loops for the instruments whose auditory properties are very similar (tempo in part 1 instrument 1 loop 1 is 78—so the loop for part 2 instrument 1 is selected to have a tempo±2

(76 or 80) bpm). If the variance level is high this threshold area widens, e.g., it might widen with each step in the variance level±4.

According to another example, a variation in the loop selection process might be introduced by adding a random amount to each value that is used in the selection of a new loop. That is, in some embodiments a parameter that represents "calmness" might be provided for each loop. This parameter might represent, e.g., the amount of dynamic variation in that loop. Assume for purposes of discussion that the value of an initial existing loop is 0.60. If, for example, the randomization amount is set to 5%, when the AI system searches for loops to include in the skeleton, the search might be broadened to include loops with calmness values between 0.57 and 0.63 and, in some embodiments, values at the extremes might be preferentially selected, with the selection among multiple qualifying loops preferably being random in some embodiments.

In other embodiments, the user might be provided with a graphical user interface that shows, e.g., the ten most prominent parameters of either each loop or the whole generated song. This GUI could also provide a control that allows the user to prioritize each parameter, with the prioritization ranging from 100% to 0%, with 0% meaning that a parameter is never considered and 100% meaning the parameter is the most important, perhaps sole, parameter considered. By manipulating the individual controls for each parameter, the user will be able to instruct the AI system, e.g., to select more loops with a female singing voice (control to 100%) and completely ignore loops with aggressive mood (control to 0%). A setting of 50% for the parameter style could instruct the AI system to "mix" it up regarding the loop selection, i.e., the designated parameter is somewhat important, but the AI is permitted to stray from the base style determination set by the skeleton model.

Figure 4:
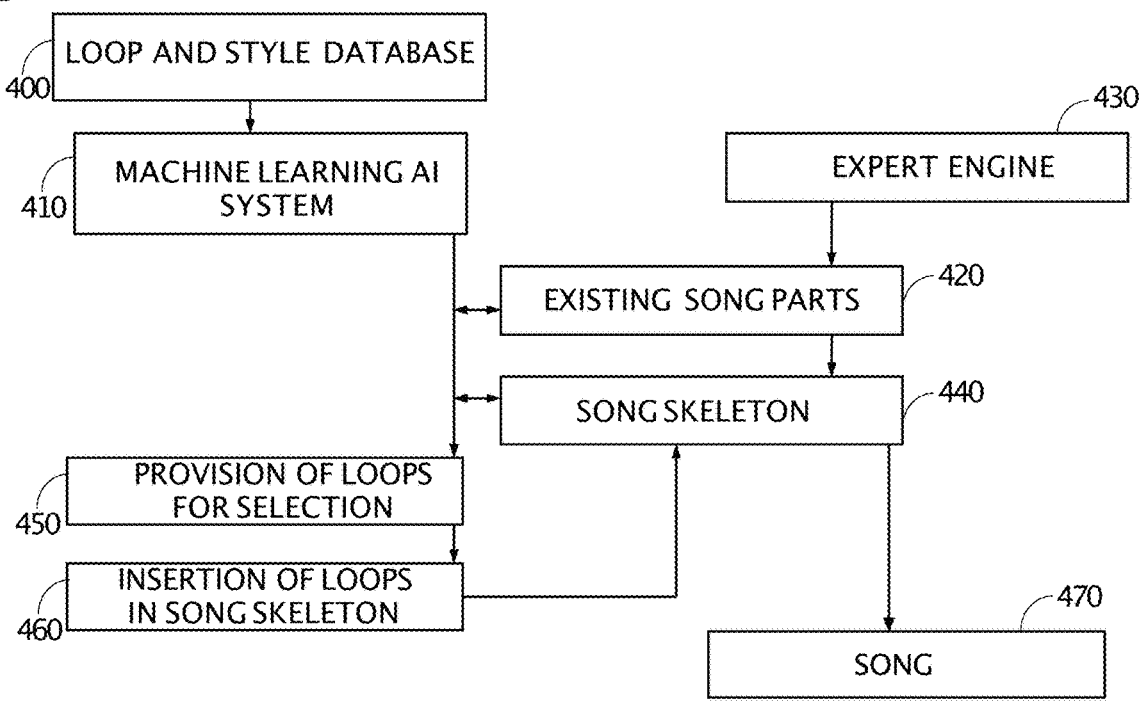
FIG. 4 depicts the functionality of the machine learning AI utilized in a variation of the instant invention.

Turning next to FIG. 4, this figure is depicting an embodiment that illustrates the functionality of the machine learning AI system 410. The system for machine-based learning is constantly being trained with the complete available database of styles and the therewith associated audio loops 400. Constantly meaning that, as has been disclosed, the loop and style availability changes over time, with new content being added to the database and content base or removed from it with the AI constantly evaluating these changes. The AI has complete knowledge of every audio loop, its auditory properties, length, tempo, dynamic and key. Additionally, the AI does know which audio loops are available locally for the user and which have to be purchased online.

Based on the song skeleton 440 generated by the expert engine 430 which utilizes any user-provided existing song parts and their associated audio loops 420 and based on the information of the selected loops in the existing song parts 420 the AI selects suitable audio loops from the database for the expert engine-generated song parts making up the song skeleton and automatically fills 460 the available data structures of the generated song skeleton 440 resulting in a completed song 470. In another embodiment the AI provides the determined audio loops for selection by the user 450, therewith providing more experienced users the ability to take on a more active part in the song generation process by manually deciding which audio loops to insert 460 into the song skeleton 440. The audio loop selection of the AI system is not bound by the initial style selection of the user, which results in a much bigger selection horizon compared to the manual selection of audio loops by the user. The utilization of the AI disrupts the predefined "only audio loops from the selected style" selection form music generation in an innovative, efficient and time saving manner.

The selection of suitable audio loops is realized utilizing all the known data from the available initial song parts. The existence of, in one embodiment, at least one song part that comprises of a length of 4 to 8 measures is sufficient for the functionality of the instant invention. Each of the potential song parts has instruments (for example drums, bass, guitar, synthesizer, vocals) selected and for each instrument at least one audio loop is inserted and selected. Each audio loop is stored in a database that additionally stores its individual auditory properties as well as its association to an instrument and style. The AI system initially determines the instruments from the existing song parts and determines compatible and usable instruments in a next step—this is realized by an ad hoc judgment regarding the usability of different new audio loops from individual instruments with respect to the already inserted and selected instruments and audio loops. This ad hoc judgment provides a determination above a specific threshold level which instrument and audio loop is acceptable in the specific song part of the generated song skeleton. In a next step the different and new audio loops are selected, provided to the user, and ultimately inserted into the generated song skeleton, this being carried out either automatically or depending upon user approval.

Figure 5:
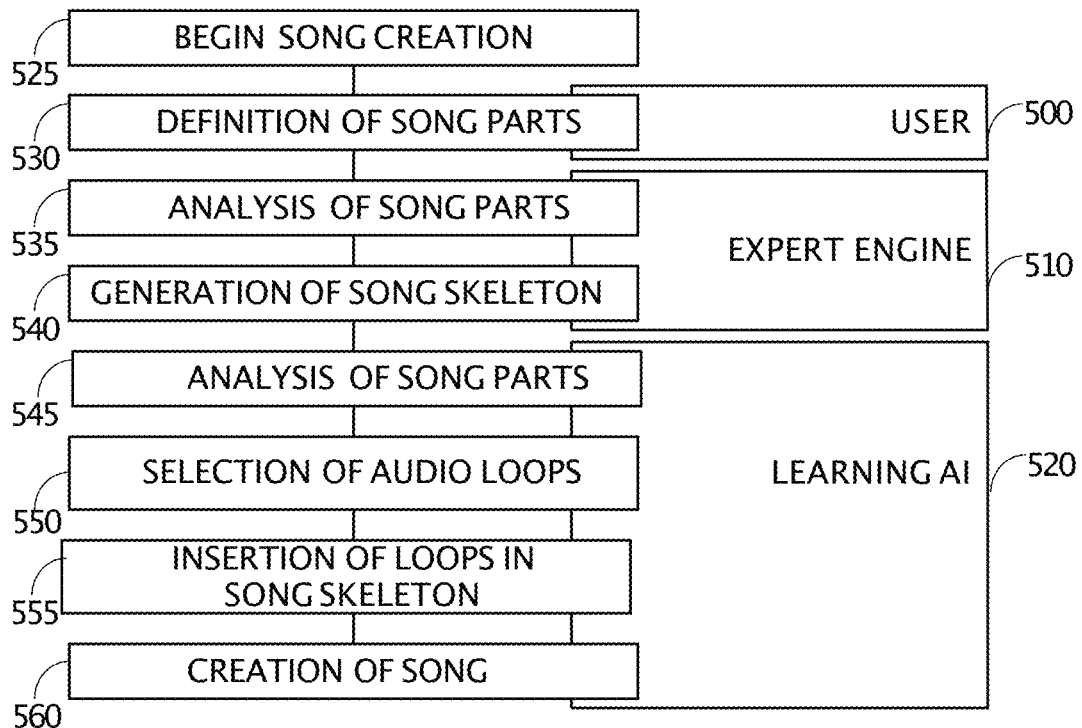
FIG. 5 is an illustration of a compressed form of the workflow of an embodiment the instant invention.

Coming next to FIG. 5, this figure is an illustration of one preferred workflow of the instant invention. As a first preferred step the user 500 initiates the song creation or generation process 525 from within a software program used for this purpose. In a next preferred step the user 500 begins the manual creation of a song or music piece by defining individual song parts (at least one) 530 and providing these song parts with style selection, instrument selection and audio loop selection. In a next preferred step, either automatically or depending on activation by the user, the expert engine 510 begins the analysis of any already generated song parts 535 and as a result of that analysis generates a song skeleton 540, representing a full song consisting of a plurality of individual song parts.

Continuing in more detail, the song skeleton generation process is initiated by the expert engine by determining the user selected style or styles from any previously song parts or any of the information provided by the user. Depending on the determination of the style the expert engine makes the following sorts of choices—it should be understood that these choices do not need to be carried out sequentially, it might also be possible that the expert engine could be configured to process the mentioned points in a different order. In one embodiment, the expert engine determines a suitable length of the target song; this might depend, for example, on the initially selected style. For example, a 12-bar blues will typically have a verse that is 12 measures long, e.g., in the key of C the progression would be C-C-C-C-F-F-C-C-G-F-C-C.

Next according to an embodiment, the expert engine determines the song scheme or song skeleton—for example, "Intro-Verse 1-Verse 1 Variation-Refrain 1-Verse 2-Verse 2 Variation-Refrain 2-Verse 3-Verse 3 Variation-Refrain 3-Ending". Then pluralities of different instruments are selected, where these instruments are selected to be compatible with the selected style. The expert engine also determines harmony sequences that are typical for the selected initial style—for example for a blues style a chord change pattern of C-C-F-F-C-G-F-C (in the key of C) would be a fitting harmony or chord sequence, where the letters represent chords in one variation of a traditional 8-bar blues.

Of course, there are a number of variations of, in this example, the 8-bar blues and the expert engine would be free to choose among them. One way to do this might be to choose a skeleton randomly from among those available. As another example, a familiar rock chord progression (in the key of G) might be G-D-E-C-G. Also, the dynamics structure for the song skeleton will be determined where, for example, the dynamics will be being defined as having a step wise increase from the beginning to the end of the song, e.g., the song would tend to get louder. The expert engine also could specify the level of the variation for each to be created song part, for example a definition of how many of the audio loops in each song part could be exchanged and how much the audio loops will be allowed to differ from the audio loops selected by the user.

The data that is utilized as the basis for the expert engine is gathered from a data foundation collected from experienced song producers, wherein in a preferred embodiment for each individual style a specific data set is created and stored in a database (preferably xml-based). The data will be constantly under review by these experts and will preferably be updated and varied at any time.

In a next preferred step, the machine-based learning AI 520 takes into account the data from the expert engine, the generated song skeleton 540 and any user-created song parts 545 or any other information given by the user and begins with the selection of audio loops 550 and inserts these audio loops into the song skeleton 550 therewith creating the song 560.

After the song has been created utilizing the above listed steps and processes, the user might want to generate different variants of the created song, wherein these variants are preferably automatically generated utilizing the automatic creation of song variants having different energy levels.

In video production it is usually the desire of the producers to have low, medium, and high energy music available to illustrate different video scenarios and differing content in video material. It is desirable that the created song variants will have the same length, the same bpm values and the same harmony patterns and can be utilized by the producer either consecutively or concurrently. In the concurrent layout approach the three song variants discussed below can be layered onto three different and independent audio tracks in the multimedia editing program wherein the user can mute/unmute specific audio tracks at any specific moment and according to his/her desire without musical distortion and depending on the specific content of the video material. Preferably in one embodiment a short crossfade will also be able to cover the changes between the individual audio tracks.

Broadly speaking, this aspect of the instant invention includes four different approaches, i.e., four different methods are provided to the user for utilization. The first method is based on the selection of an initial song part that is to be used in the creation of a song. This song part will be used as the basis for song generation.

The second and third approaches are both designed to operate after a song has been generated and accepted by the user. In these variations, the user has expressed a desire to generate a number of low and medium energy versions of the chosen song. Both of these approaches propose a similar approach of automatically reducing the energy of a song without manual mixing and muting of individual instruments and instead provide automatic configuration settings for the volume and the actual employment of individual instruments as part of the song.

The fourth approach can be applied to any available song material whether or not it has been generated by the machine learning AI. In this particular approach a de-mixing algorithm is applied to the selected song, wherein the de-mixing algorithm generates at least three audio tracks that make up the selected song. Those of ordinary skill in the art will understand that the phrase "de-mixing" refers to audio source separation, e.g., where a mono recording is de-mixed to put the vocals in one channel and the instruments in another. In other instances, a single instrument might be isolated and extracted (e.g., the bass), rebalanced (e.g., increased or decreased in volume) and then recombined with the track it was extracted from to produce a more pleasing composite work. The energy of these individual tracks is then adapted to create the low and medium energy version.

With respect to the first approach, this method is initialized at the beginning of the song generation process. In this case, the user selects a seed part, a song part that contains a high energy level. The term energy level is determined by the number of instruments in the seed part and equally important by the type of the instruments available in the seed part. Typically, a song part that is considered to be a high energy level if that part will be one that contain at least six instruments and at least one or more of the following instruments drums, percussions, bass, guitar, and synth.

Additionally, it should be mentioned that in a preferred embodiment the maximum number of instruments or tracks that are a part of the song skeleton is twelve, although that is just a preferred arrangement and those of ordinary skill in the art will understand that more or fewer instrument tracks might be used. In some cases, the twelve instruments will be denominated as bass, strings, drums, brass woodwind (either brass or woodwind instruments, or a combination), percussion, keys, vocals, FX (e.g., sound effects such as crashes, scratches, etc.), tonal percussion (e.g., vibraphone, steel drum, marimba, etc.), guitar, samples, and synth. It should further be noted that this listing is not meant to resemble a specific priority listing of the instruments.

In this particular embodiment the user will select an initial seed part, which will preferably be chosen from a selection of available high energy seed parts. As the user generates a song part with music generation software and, the instant method will monitor the generation process and will inform the user about the energy level status of the song part. Additionally, in some embodiments the user will be able to activate the energy level variant generation process as soon as the user-generated song part meets the requirements of a high-level energy song part.

Once the user has selected a generated or provided a high energy song part this embodiment will provide the user with the option to generate a controlled energy song part, where the energy level of the song part might be, for example, a high energy song, a medium energy song or a low energy song. It should be noted that the user will not be required to generate of all of the energy level variants. However, that will preferably be an option if the user desires. In some cases, the user might select one, or two of the provided energy level options or none of them. Also, the user might elect to initiate the generation of the different energy level versions at a later time. In this case the user will be able to either select the initial seed song part again or select the previously generated song and the instant invention will accordingly provide the user the option to generate the medium or low energy versions.

If the user selects the option to generate a high-level energy version of the song from the selected seed song part, the instant embodiment will initiate the song generation steps disclosed above wherein the machine-based learning AI will take into account the data from the expert engine, the generated song skeleton and the selected seed song part as it begins to select audio loops and insert these loops into the song skeleton. This approach will then create a high energy level version of the song.

If the user elects to generate the medium or low energy song version the instant invention will process the selected seed song part, taking into account the selected energy level and applying that choice to the contents of the seed song part, with the changes increasing according to the desired decrease in energy level of the song.

If the user requested a medium energy song version, this embodiment will stepwise disable instruments from the seed part. Preferably no more than two instruments will be disabled. The step wise process is dependent on the instruments in the seed part, i.e., there is a ranking order within the instruments, with instruments having a higher priority for disablement when generating a medium energy version, i.e., an instrument hierarchy. A typical example of such a ranking order or hierarchy would be, in decreasing energy order, Drums, Samples, FX, Vocals, Brass Woodwind, Synth, Tonal Percussion, Strings, Keys (i.e., keyboards), Guitar Bass, with Drums being the first to be muted and Guitar Bass being the last. The previous list is only given as an example and is not intended to be exhaustive.

After the corresponding instruments have been disabled the instant invention will provide a seed part with at least four instruments to the song generation process which has been directed to generate a medium energy version song from the selected seed part. The steps being taken are the utilization of the data from the expert engine, the generated song skeleton and the selected adjusted seed part leading to the AI based selection of audio loops and insertion of these loops into the song skeleton, thereby creating the medium energy level version of the song.

As has been disclosed in case of the steps associated with the generation of the medium energy version of a song, creating the low energy version of the song expedites the step of implementing changes to the seed song wherein at least four instruments of the selected seed part will be disabled with the same priority ranking order of the instruments disclosed in connection with the generation of the medium energy version As discussed previously, a preferred ordering would start with Drums being the first to be disabled, and then that instrument would be followed by Samples, FX, Vocals, Brass Woodwind, Synth, Tonal Percussion, Strings, Keys, Guitar and Bass, preferably in that order. As was noted previously, this list should not be seen as an exhaustive nor should this particular order be definitive. It should be clear that there might be other instruments included as part of the setup of the seed part and would additionally be subject to disablement. After the disablement of the corresponding instruments the instant embodiment will utilize the modified seed part. The seed part will preferably merely contain two instruments in the case where a low energy level version of the song is to be created. From that adjusted seed part the instant embodiment will then create the low energy level version of the song utilizing the data from the expert engine, the generated song skeleton, and the AI system, with the AI system controlling the selection of audio loops and insertion of these audio loops into the song skeleton.

With this approach the user will have the opportunity to generate very different songs in terms of energy level, yet these songs feature such a similarity with each other that all songs could function as an integrated adaptive soundtrack for any video of the user. As previously noted, the user will not always generate all three different energy level versions of a song. The user might want to select the initial seed part and then generate only one energy level song version.

As has been disclosed, the other two song variation generation methods in contrast to the first method are designed to be initiated after the generation of a song or on a preexisting song. Both song variation generation methods are provided to the user when the instant invention determines a generated song to be of high energy, thereby providing the user the opportunity to generate low and medium energy level versions.

The first of the two post-generation song variation generation methods provides an automatic adaptation of the energy of a song without the need to manually mix or mute individual instruments. This approach is linked to the instruments selected and utilized in the song and provides a step wise adjustment of specific instruments depending on the desired energy level of the song (low or medium). Additionally, the reduction in the number of instruments may also be included as part of the energy reduction process of the song variant generation.

According to an embodiment, the method iterates through the setup/skeleton of the high energy version of the song and initially starts with drum and percussion instruments. For the generation of the medium energy version the volume of the drum and percussion instrument is reduced to 25 (where 50 is the normal or median volume level for an instrument) or one-half of the normal value for that sort of instrument. Note that in some embodiments "50" will be based on a calculation of the median volume level for all of the same-type loops in the database. In other instances, it might be an assigned ideal value (e.g., in decibels, RMS amplitude, etc.) that all of the loops of that kind are measured against. Those of ordinary skill in the art will readily be able to devise alternative ways to calculate or determine this parameter. Although preferably the reduced volume will be about one-half of the typical volume, it should be clear that that amount might be varied up or down depending on the needs of the user. Additionally, and as is described further below, in some cases the volume level will be adjusted relative to the other tracks in the work rather than with respect to an absolute volume level.

For the generation of the low energy version, the drum instrument will preferably be completely muted, but that is only done if at least one other instrument is active. Next, the instant embodiment selects the vocals, FX, and samples instrument channels and for both the medium and low energy version of the song the algorithm will mute these instrument channels. That assumes that at least one other tonal instrument channel is active. These tonal instrument channels are keys, strings, synth, brass, bass, guitar and tonal percussion. If none of these tonal instrument channels are active the algorithm will set the volume of the vocals, FX, and samples instrument channel to about 20 (with 50 being the normal median volume level). As explained previously, a volume level of about 20 is preferred relative to the average volume of instrument tracks of that type. Preferably, though, whatever the chosen volume level is it will be about 20% less than that of the drum or percussion instrument track.

The next step is the reduction of melody lines for both the medium and low energy version. First, the algorithm identifies melody instrument channels, such as synth, brass, and guitar, etc. For the medium energy version, the volume of these instrument channels is reduced to about 25 (with 50 being the normal median volume level) and for the low energy version these instrument channels are completely muted, but only if at least two more instrument channels remain active. In some instances, the volume level will be reduced to about 80% (or 20% less than) that of the drum or percussion instrument track.

In the next step the method will identify the bass instruments channel and will reduce the volume to about 30 (with 50 being the normal median volume level) for the medium energy version of the song and to about 20 (with 50 being the normal median volume level) in the low energy version of the song. As was explained previously, another way to perform this step would be to change the volumes of these instrument tracks to about 20% higher and about 20% lower, respectively, as compared with the volume of the drum/percussion track. These steps (1 to 4) will be utilized for all parts of the high energy version of the song.

In the next step the method will check the number of instrument channels of each song part and for the medium energy version the number will be limited to a maximum of five channels and for the low energy version to a maximum of three. Although the number three might be varied depending on the needs of the user. This limitation will be implemented according to the following priority listing of instrument channels: Vocals, FX, Samples, Synth, Brass, Tonal Percussion, Strings, Drums and Percussion, with Drums and Percussion being the first track that will be muted.

In addition, in some embodiments the volume levels of all instrument channels will be inspected and if they are above a setting of 50 (with 50 being the normal median volume level) the levels will be set to 25. The previously disclosed six steps will be applied to the high energy version of the song and will generate a medium and low energy version from that particular song. Note, of course, that the suggested volume level changes might also be applied in a relative form if that is necessary or desired by the user as described previously. For example, a setting of 25 might be equivalent to 0.5 and similarly for other changes of volume level. Additionally, in some embodiments the volume level of the song parts might be arbitrarily scaled to lie between 0 and 1.0.

A third method for generating medium and lower energy versions of a song is based on the premise that the volume level of each audio loop in song parts and instruments can be set as some factor of the original volume level. This algorithm is especially useful in connection with user-generated songs, which already utilize certain specific volume levels. The absolute volume level of the existing song might be measured in terms of peak volume level, median volume level, RMS volume level, etc.

As was discussed previously, several steps will be applied to the initial song. In the first step the energy level of the drum and percussion instrument channel will be reduced. For the generation of the medium energy version the volume level of the drum and percussion instrument channel will be set to about 0.4 (e.g., 0.4*50=20) and for the low energy version these instrument channels will be set to about 0.1 (e.g., 0.1*50=5). In the next step the volume level of the vocals, FX, and samples instrument channel will be set to about 0.3 for the medium energy level version and to about 0.15 for the low energy version.

As a third step the method processes the melody lines of the initial song. First, the melody instrument channels will be identified. Typically, the melody will be carried by instruments such as synth, brass, and/or guitar. To generate the medium energy version the volume of these instrument channels will be set to 0.5 and for the lower energy version the volume of these instrument channels is set to 0.3. In the next step, this embodiment of the method will identify the bass instrument channels and reduce the volume level of these instrument channels to 0.6 for the generation of the medium energy version and to 0.3 for the generation of the lower energy version.

After the initial four steps, the volume levels of all instrument channels will be inspected and set, for example, at 0.4 (i.e., 0.4*50=20) for the medium energy version and to 0.2 (i.e., 10) for the low energy version if the volume level is above or equal to 50 with 50 being the normal median volume level. All these determined volume level changes are applied to the song parts of all instrument channels, thereby generating the medium energy level version and/or the low energy level version from an initially selected song that is determined to be at a high energy level.

A fourth approach would be usable with any available audio material from which the user would like to generate medium and/or low energy version variants. In this embodiment, the user initiates a de-mixing algorithm that analyzes the audio material of the audio material and separates it into at least three separate instrument tracks. The tracks will be identified as type of instrument, e.g., vocals, drums and other. For the generation of the medium energy version the instant invention will reduce the volume of the drums to 30% of its current volume and it additionally reduce the volume of the voice instrument to 50% of its current volume. With these adjusted volume settings, the medium version can be generated. The low energy version is preferably generated with a volume adjustment to 0% for the drums and with a volume adjustment to 20% for the voice instrument. That being said, it should be noted that the particular adjustment settings offered above are for illustrative purposes only. It should be clear that there could be a multitude of different adjustment variants to generate the desired medium and low energy versions. Thus, it should be clear that the fourth approach would be especially useful if a user desired to generate medium or low energy versions of a high energy source.

Figure 6:
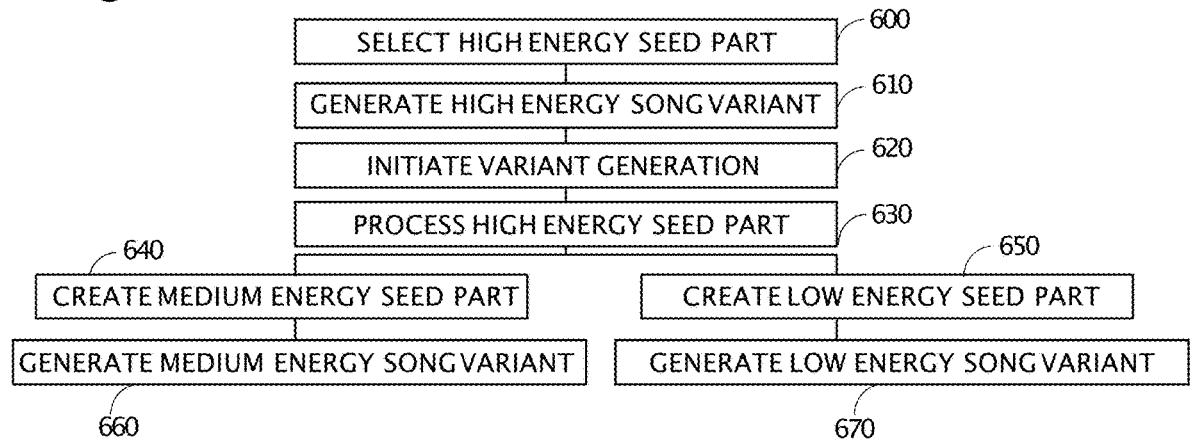
FIG. 6 illustrates a workflow of the first algorithm of the variant generation process of the instant invention.

Now turning to FIG. 6, this figure illustrates one possible workflow associated with the first method discussed previously. In a first preferred step the user who wants to generate song variants selects an existing, previously generated song part 600 for which the instant embodiment is to generate the song variants. The selected seed part will be typically be required to be one that contains at least six instrument channels which would tend to qualify it as a high energy seed part. Next the user will initiate the variant generation process 610 using the high energy song variant by interacting with the graphical user interface of the software program. In this embodiment the instant invention will initiate the song generation steps disclosed previously in connection with the machine-based learning AI. The AI will take into account the data from the expert engine, the generated song skeleton and the selected high energy seed song part and begin selecting audio loops and inserting these loops into the song skeleton, therewith creating the high energy level variant of the song.

Next the user will typically initiate the variant generation process 620 either manually or the instant invention will automatically detect that a high energy seed part has been selected and will initiate the variant generation process by automatically generating medium and low energy seed parts. As a next preferred step, the high energy seed part will be processed by the instant invention 630. To generate the medium 640 and low 650 energy seed part modification will be initiated, with the generation of the medium energy seed part 640 the instant invention will disable and remove two of the instrument channels from the seed part according to the sort of ranking previously discussed, with the seed part for the medium energy version containing at least four instrument channels after the modification.

The instant embodiment will then, in a next preferred step, select the generated medium energy seed part and will initiate the song generation steps disclosed in this specification, where the machine-based learning AI will take into account the data from the expert engine, the generated song skeleton and the selected medium energy seed song part and begin the selection of audio loops for insertion into the skeleton. This embodiment will then ultimately produce the medium energy level variant of the song 660.

For the generation of the low energy seed part 650 the instant embodiment will also begin from the high energy seed part and will also initiate modifications to that part by making changes to the instrument channel setup. The instant embodiment will disable four instruments from the instrument channel setup of the high energy seed part, according to the sort of ranking discussed previously, i.e., Drums, Samples, FX, Vocals, Brass Woodwind, Synth, Tonal Percussion, Strings, Keys and Guitar, with the seed part for the low energy version containing at least two instrument channels after the modification. It should also be noted that it might also be possible that the low energy version will be generated after processing the medium energy seed part. In that case the medium energy seed part will be selected by the user and two instruments from the instrument channel setup of the medium energy seed part will be disabled according to the sort of ranking identified above.

The instant embodiment will then, in a next preferred step, select the generated low energy seed part and initiate the song generation steps disclosed in this specification above, i.e., the machine-based learning AI will take into account the data from the expert engine, the generated song skeleton and the selected low energy seed song part in order to begin the selection of audio loops and insert these loops into the song skeleton, thereby creating the low energy level variant of the song 670.

Figure 7:
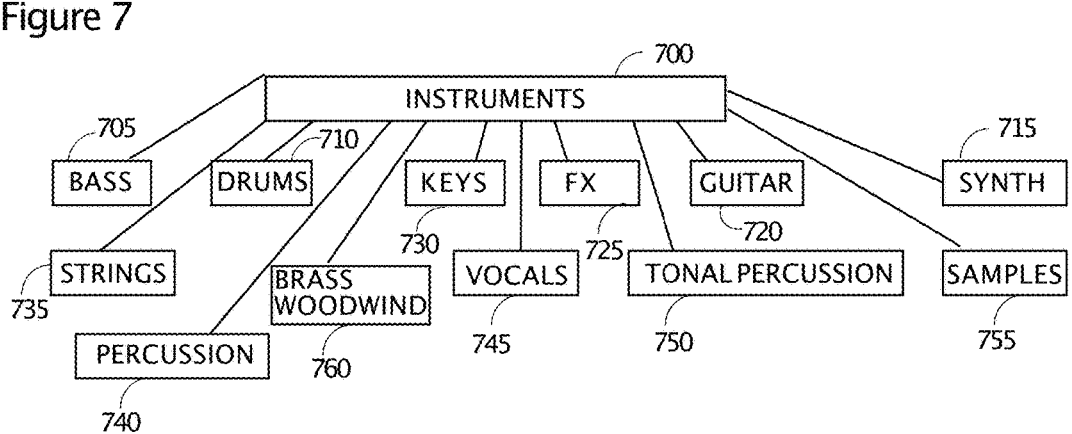
FIG. 7 depicts the structural setup of the instruments making up the song.

Turning next to FIG. 7, this figure depicts one possible structural setup of the instruments 700 that comprise the song parts. It should be noted that the listing represents the maximum number of instrument channels potentially available in a song part, but it is also possible that song parts contain fewer instrument channels. The instrument channels are bass 705, drums 710, keys 730, FX 725, guitar 720, synth 715, strings 735, percussion 740, vocals 745, tonal percussion 750, samples 755 and brass woodwind 760.

Figure 8:
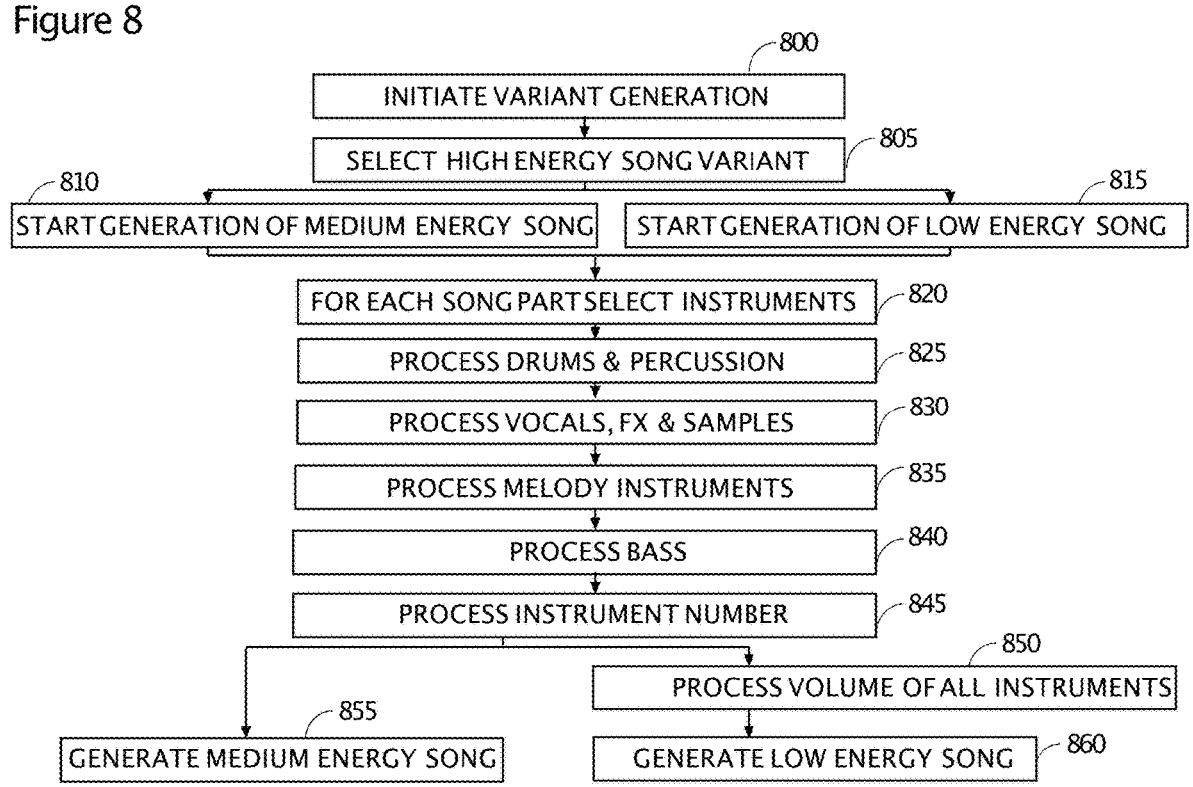
FIG. 8 is an illustration depicting the workflow of the second algorithm of the variant generation process of the instant invention.

Coming next to FIG. 8, this figure illustrates a workflow associated with the second method of the variant generation process of the instant invention. As a first preferred step the user will initiate the variant generation process 800. This process, in contrast to the first method, is a post processing approach, meaning that it will be initiated after the system disclosed in this specification generated a song. As a next preferred step, the user will select the generated song, wherein this song will be assumed to be a high energy version 805. In a next preferred step, the generation of both the medium energy version 810 and the low energy version 815 will started simultaneously, i.e., for each song part of the high energy version the song part instruments are selected and processed 820 with a differing intensity/volume depending on the type of output energy version (medium or low).

In a first preferred step, the drums and percussions instrument channel will be processed 825. As discussed previously, in some embodiments the volume of the drum and percussion instrument channels will be reduced to 25 (with 50 being the normal or median volume level) for the medium energy version and the volume of these instrument channels will be muted completely for the low energy version, assuming that at least one other instrument channel remains active.

Next, the vocals, FX, and samples instrument channels will preferably be processed 830. The medium and low energy versions these instrument channels will be muted in the order vocals, FX, and samples, as long as at least one other tonal instrument channel remains active. In this embodiment, the tonal instrument channels that will be monitored include instruments such as keys, strings, synth, brass woodwind, bass, guitar, and tonal percussion. If no other tonal instrument channel is active the volume of the previous instrument channels will be set to 20 (with 50 being the normal median volume level).

Next, the melody instruments of the song parts will preferably be processed 835. Channels containing melody instruments will typically include instruments such as synth, brass woodwind, and guitar. For the medium energy version, the volume of these instrument channels will be reduced to 25 (with 50 being the normal or median volume level) and for the low energy version these instrument channels will be muted, if at least two more instrument channels remain active.

As a next preferred step, the method will process the bass instrument channels 840. As described previously, bass instrument channels will first be identified and then the volume of those channels will be set to 30 again (with 50 being the normal median volume level) for the medium energy version and 20 (with 50 being the normal median volume level) for the low energy version.

Next, the overall instrument channel number will preferably be determined and processed 845. For the medium energy version, the maximum number will preferably be reduced to five channels and for the low energy version to three. A priority ranking of instruments types the sort discussed previously will be used to determine the energy level of the channels, e.g., Vocals, FX, Samples, Synth, Brass Woodwind, Tonal Percussion, Strings, Drums, Percussion, Guitar, Bass, Keys. The reduction is implemented either via muting of the corresponding instrument channels or by deleting them from the setup of the song part.

As a next preferred step, for the generation of the low energy version the instant embodiment will process the volume of all instrument channels 850, i.e., a global volume will be determined. This processing will determine the volume levels of the instrument channels and if these are higher than the median volume level of 50, the volume level will be reduced to 25.

All of the above-mentioned processing results for the generation of the medium and low energy version of the song can either be implemented on the fly as the processing steps are initiated therewith dynamically generating the medium 855 and low 860 energy song variation. However, it is also possible that the instant invention will store the determined processing settings and will implement these after all disclosed processing step have been completed therewith generating the medium 855 and low 860 energy song variation. Additionally, it should be noted that all the processing steps are without user interaction and are implemented automatically.

Figure 9:
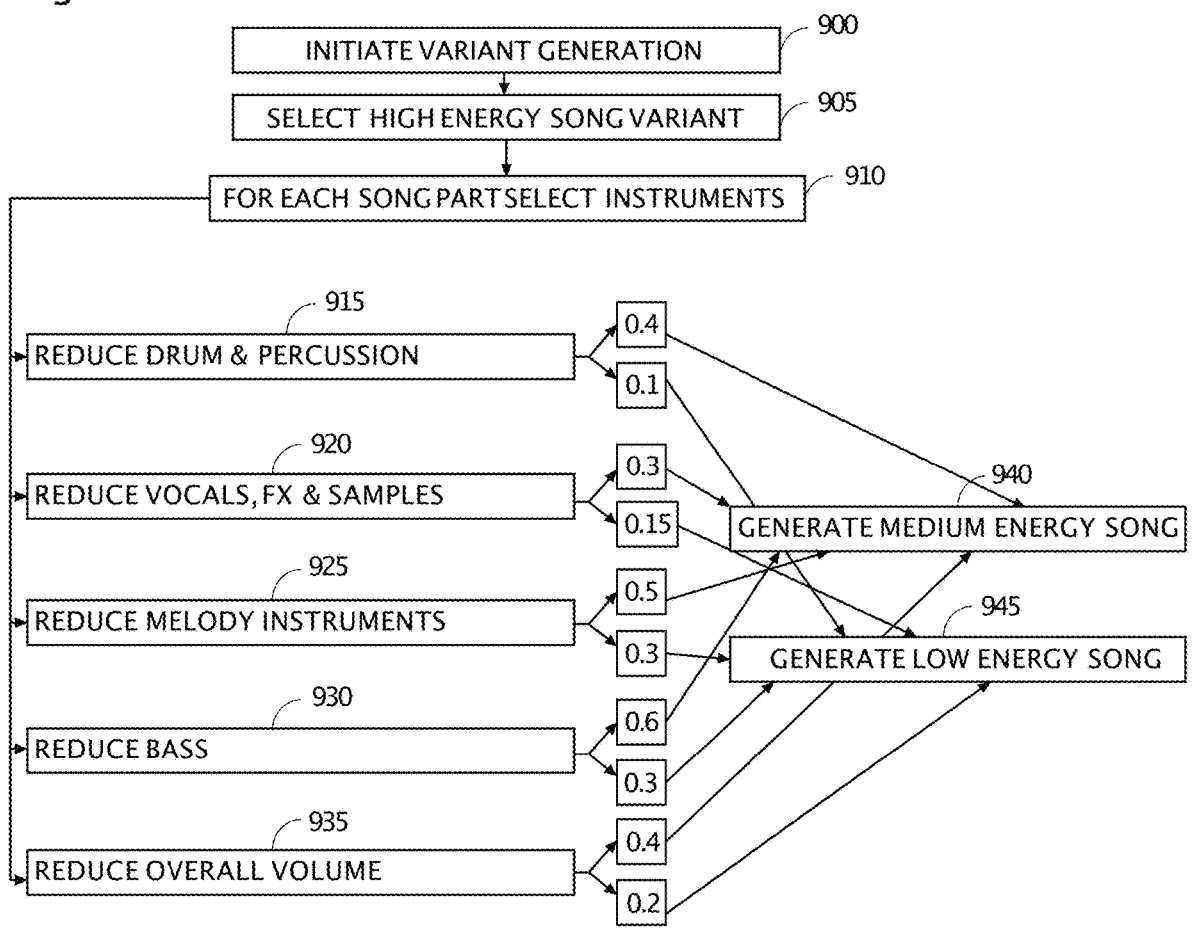
FIG. 9 depicts a flowchart of the third algorithm of the variant generation process of the instant invention.

Coming next to FIG. 9, this figure depicts an exemplary flowchart of the workflow of the third method of the variant generation process. As a first preferred step the variant generation according to this algorithm will be started 900. Starting the generation process will require selecting the high energy song variant 905. In a next preferred step for each song part of the high energy song variant the instrument channels will be selected 910 and in a next preferred step a plurality of predefined processing settings for the instrument channels of each song part will be generated and then implemented on the high energy song variant generating the medium 940 and low energy song 945.

The processing settings are primarily directed to the volume levels of the instrument channels. The volume levels of drums and percussion instrument channel will be reduced to 0.4 for the medium energy version and 0.1 for the low energy version 915. The volume levels of vocals, FX, and samples instrument channels will be reduced to 0.3 (i.e., 0.3*50=15) for the medium energy version and 0.15 for the low energy version 920. The volume levels of melody instrument channels will be reduced to 0.5 for the medium energy version and 0.3 for the low energy version 925. The volume level for the bass instrument channel will be reduced to 0.6 for the medium energy version and 0.3 for the low energy version 930. Additionally, the volume levels of all instrument channels will be reduced to 0.4 for the medium energy version and 0.2 for the low energy version if the volume level of these instrument channels is higher than the median volume level of 50.

Figure 10:
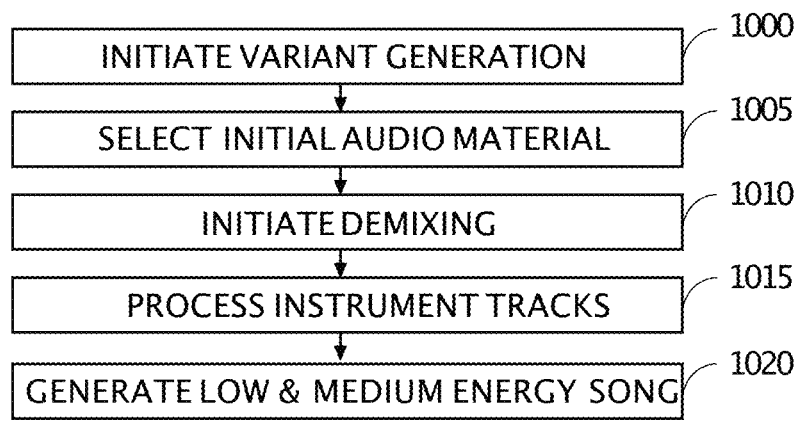
FIG. 10 is an illustration of the workflow of the fourth algorithm of the variant generation of the instant invention.

Turning next to FIG. 10, this figure is an illustration of an embodiment of the workflow of the fourth method of variant generation. As an initial step, the user will initiate the variant generation process of the fourth method 1000, which operates on a previously selected song. The initial audio material is preferably audio material of high energy, or at least considered by the user as being of high energy. As a next preferred step, the instant invention initiates a de-mixing algorithm 1010 that will analyze the audio material and separates the initial audio material into at least three separate instrument tracks, these instrument tracks being vocals, drums and other.

After the separation of the audio material into at least these three different instrument tracks, the instrument tracks will be automatically processed by the instant invention 1015. For the medium energy version, the volume of the drums instrument track will be reduced to 30% and the volume of the voice instrument track will be reduced to 50%. For the low energy version, the volume of the drums instrument track will be reduced to 0% and the volume of the voice instrument track will be reduced to 20%. With these adjustments both the low and medium energy versions are generated 1020.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional elements.

It is to be understood that where the claims or specification refer to "a" or "an" element, such reference is not be construed that there is only one of that elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that tem1s of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

CONCLUSIONS

Of course, many modifications and extensions could be made to the instant invention by those of ordinary skill in the art. For example, in one preferred embodiment an experienced user might be provided with an elaborate graphical user interface allowing the user to define specific parameter regarding the song creation. So, for example, a graphical user interface might be provided that allows the user to define the length of the desired song, a specific value determining the variance of the song—meaning defining how diversified the song should be and how much the song is allowed to differ from the original ideas of the user Additionally, it might be possible for the user to control the style selection—defining which styles are usable by the AI and which are off limits—with a strict limitation option as well as a variable option, wherein the strict limitation defines desired and non-desired styles, and the variable limitation is depending on the variance setting. Furthermore, the user might be allowed to influence the harmony setting, defining which keys the song should be using. Also, a determination of the dynamic scheme might be possible, allowing the user to define a dynamic curve for the song.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A computerized method of generating an energy-based music work, comprising the steps of:
   (a) requiring a user to select a music style from among a plurality of music styles;
   (b) requiring the user to select at least one high energy seed part, where each of said at least one high energy seed parts comprises at least twelve channels;
   (c) requiring the user to select a medium energy level or a low energy level;
   (d) in a computer, said computer programmed to perform the steps comprising:
       (d1) for each of said at least one selected seed parts, if the user has selected said medium energy level, automatically disabling at least two channels in said selected seed part, thereby creating a processed selected seed part and
       (d2) for each of said at least one selected seed parts, if the user has selected said low energy level, automatically disabling at least four channels in said selected seed part, thereby creating said processed selected seed part;
       (d3) using an expert engine to automatically analyze each of said processed at least one selected seed part to produce a music work skeleton structure based on said selected music style and said at least one processed selected seed part;
       (d4) accessing an audio loop database containing a plurality of audio loops, each of said audio loops having a same loop style as said selected music style and each of said audio loops having a plurality of performance parameters associated therewith;
       (d5) using an AI system to select a plurality of audio loops from said audio loop database based on said plurality of performance parameters associated with each of said plurality of audio loops;
       (d6) using said AI system and said plurality of performance parameters associated with each of said selected plurality of audio loops to insert each of said selected audio loops into said music work skeleton structure, thereby forming said energy-based music work; and
       (d7) performing at least a portion of said energy-based music work for the user.

2. The method according to claim 1, wherein each of said selected at least one seed part channels is one of a drum channel, a samples channel, an FX channel, a vocals channel, a brass woodwind channel, a synth channel, a tonal percussion channel, a strings channel, a keyboard channel, and a guitar channel.

3. The method according to claim 2, wherein said drum channel, said samples channel, said FX channel, said vocals channel, said brass woodwind channel, said synth channel, said tonal percussion channel, said strings channel, said keyboard channel, and said guitar channel form an ordered list of instrument channel energy levels, with said drum channel being a highest energy level and said guitar channel being a lowest energy level.

4. The method according to claim 3,
   wherein step d1 comprises the steps of:
       (i1) for each of said selected seed part channels, identifying which of said ordered list of instrument channels is associated with each of said selected seed part channels, and
       (i2) using said ordered list of instrument channels to disable said at least two channels of said selected seed part, and
   wherein the step d2 comprises the steps of:
       (ii1) for each of said selected seed part channels, identifying which of said ordered list of instrument channels is associated with each of said selected seed part channels, and
       (ii2) using said ordered list of instrument channels to disable said at least four channels of said selected seed part.

5. The method according to claim 3,
   wherein step d1 comprises the steps of:
       (i1) using said ordered list of instrument channels to place said selected seed part instrument channels in order from a highest seed part channel energy level to a lowest seed part channel energy level, and
       (i2) disabling said at least two channels of said seed part associated with a highest energy level, and
   wherein the step d2 comprises the steps of
       (ii1) using said ordered list of instrument channels to place said selected seed part instrument channels in order from a highest seed part channel energy level to a lowest seed part channel energy level, and
       (ii2) disabling said at least four channels of said selected seed part associated with a highest energy level.

6. A computerized method of generating an energy-based music work, comprising the steps of:
   (a) requiring a user to select a music style from among a plurality of music styles;

(b) requiring the user to select at least one high energy seed part from a plurality of high energy seed parts, wherein each of said high energy seed parts comprises six or more channels;

(c) requiring the user to select a medium energy level or a low energy level;

(d) in a computer, said computer programmed to perform the steps comprising:

(d1) for each of said at least one selected seed parts, if the user has selected said medium energy level, automatically disabling at least two channels in said selected seed part, thereby creating a processed selected seed part and (d2) for each of said at least one selected seed parts, if the user has selected said low energy level, automatically disabling at least four channels in said selected seed part, thereby creating said processed selected seed part;

(d3) using an expert engine to automatically analyze each of said processed at least one selected seed part to produce a music work skeleton structure based on said selected music style and said at least one processed selected seed part;

(d4) accessing an audio loop database containing a plurality of audio loops, each of said audio loops having a same loop style as said selected music style and each of said audio loops having a plurality of performance parameters associated therewith;

(d5) using an AI system to select a plurality of audio loops from said audio loop database based on said plurality of performance parameters associated with each of said plurality of audio loops;

(d6) using said AI system and said plurality of performance parameters associated with each of said selected plurality of audio loops to insert each of said selected audio loops into said music work skeleton structure, thereby forming said energy-based music work; and (d7) performing at least a portion of said energy-based music work for the user.

7. The method according to claim 6, wherein each of said selected at least one seed part channels is one of a drum channel, a samples channel, an FX channel, a vocals channel, a brass woodwind channel, a synth channel, a tonal percussion channel, a strings channel, a keyboard channel, and a guitar channel.

8. The method according to claim 7, wherein said drum channel, said samples channel, said FX channel, said vocals channel, said brass woodwind channel, said synth channel, said tonal percussion channel, said strings channel, said keyboard channel, and said guitar channel form an ordered list of instrument channel energy levels, with said drum channel being a highest energy level and said guitar channel being a lowest energy level.

9. The method according to claim 8, wherein step d1 comprises the steps of:

(i1) for each of said selected seed part channels, identifying which of said ordered list of instrument channels is associated with each of said selected seed part channels, and (i2) using said ordered list of instrument channels to disable said at least two channels of said selected seed part, and wherein the step d2 comprises the steps of:

(ii1) for each of said selected seed part channels, identifying which of said ordered list of instrument channels is associated with each of said selected seed part channels, and (ii2) using said ordered list of instrument channels to disable said at least four channels of said selected seed part.

10. The method according to claim 8,
wherein step d1 comprises the steps of:

(i1) using said ordered list of instrument channels to place said selected seed part instrument channels in order from a highest seed part channel energy level to a lowest seed part channel energy level, and (i2) disabling said at least two channels of said selected seed part associated with a highest energy level, and wherein the step d2 comprises the steps of (ii1) using said ordered list of instrument channels to place said selected seed part instrument channels in order from a highest seed part channel energy level to a lowest seed part channel energy level, and (ii2) disabling said at least four channels of said selected seed part associated with a highest energy level.

11. A computerized method of generating an energy-based music work, comprising the steps of:

(a) requiring a user to select a music style from among a plurality of music styles;

(b) requiring the user to select at least one high energy seed part from a plurality of high energy seed parts, each of said plurality of seed parts comprising a plurality of channels;

(c) requiring the user to select a medium energy level or a low energy level;

(d) in a computer, said computer programmed to perform the steps comprising:

(d1) for each of said at least one selected seed parts, if the user has selected said medium energy level, automatically disabling one or more of said at plurality of channels in said selected seed part to leave four of said plurality of channels unmuted, thereby producing a processed selected seed part, (d2) for each of said at least one selected seed parts, if the user has selected said low energy level, automatically disabling one or more of said at plurality of channels in said selected seed part to leave two of said plurality of channels unmuted, thereby producing a processed selected seed part, (d3) using an expert engine to automatically analyze each of said processed at least one selected seed part to produce a music work skeleton structure based on said selected music style and said at least one processed selected seed part;

(d4) accessing an audio loop database containing a plurality of audio loops, each of said audio loops having a same loop style as said selected music style and each of said audio loops having a plurality of performance parameters associated therewith;

(d5) using an AI system to select a plurality of audio loops from said audio loop database based on said plurality of performance parameters associated with each of said plurality of audio loops;

(d6) using said AI system and said plurality of performance parameters associated with each of said selected plurality of audio loops to insert each of said selected audio loops into said music work skeleton structure, thereby forming said energy-based music work; and (d7) performing at least a portion of said energy-based music work for the user.

12. The method according to claim 11, wherein each of said selected at least one seed part channels is one of a drum channel, a samples channel, an FX channel, a vocals channel, a brass woodwind channel, a synth channel, a tonal percussion channel, a strings channel, a keyboard channel, and a guitar channel.

13. The method according to claim 12, wherein said drum channel, said samples channel, said FX channel, said vocals channel, said brass woodwind channel, said synth channel, said tonal percussion channel, said strings channel, said keyboard channel, and said guitar channel form an ordered list of instrument channel energy levels, with said drum channel being a highest energy level and said guitar channel being a lowest energy level.

14. The method according to claim 13,
wherein step d1 comprises the steps of:
  (i1) for each of said selected seed part channels, identifying which of said ordered list of instrument channels is associated with each of said selected seed part channels, and
  (i2) using said ordered list of instrument channels to disable said at least two channels of said selected seed part, and
wherein the step d2 comprises the steps of:
  (ii1) for each of said selected seed part channels, identifying which of said ordered list of instrument channels is associated with each of said selected seed part channels, and
  (ii2) using said ordered list of instrument channels to disable said at least four channels of said selected seed part.

15. The method according to claim 13,
wherein step d1 comprises the steps of:
  (i1) using said ordered list of instrument channels to place said selected seed part instrument channels in order from a highest seed part channel energy level to a lowest seed part channel energy level, and
  (i2) disabling said at least two channels of said selected seed part associated with a highest energy level, and
wherein the step d2 comprises the steps of
  (ii1) using said ordered list of instrument channels to place said selected seed part instrument channels in order from a highest seed part channel energy level to a lowest seed part channel energy level, and
  (ii2) disabling said at least four channels of said selected seed part associated with a highest energy level.

* * * * *